3,278,278
PYROHYDROLYSIS OF CARBIDE-TYPE
NUCLEAR FUELS
James R. Flanary, Knoxville, and Jerry H. Goode, Sweetwater, Tenn., and Geoffrey C. Wall, Sydney, New South Wales, Australia, assignors to the United States of America as represented by the United States Atomic Energy Commission
Filed Apr. 8, 1964, Ser. No. 358,387
4 Claims. (Cl. 23—324)

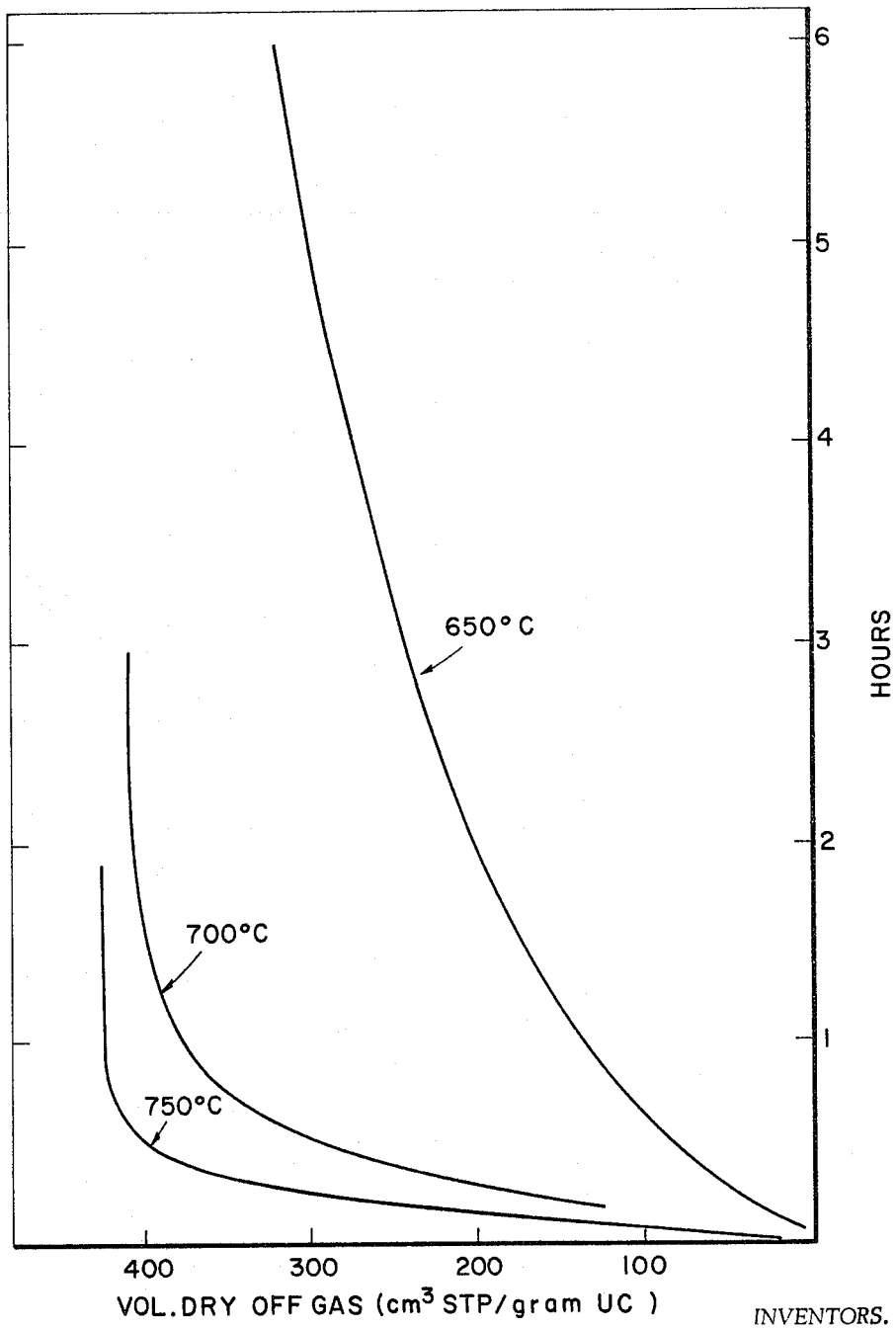

The present invention relates to a rapid and efficient method for hydrolyzing the metallic carbide components of nuclear fuel elements. More particularly, it relates to the pyrohydrolysis of a metallic carbide selected from a metal consisting of uranium, plutonium or thorium.

It is an object of this invention to convert the neutron irradiated products of a metallic carbide selected from a metal consisting of uranium, plutonium and thorium into an oxide of the said selected metal. Another object is to convert neutron irradiated fissionable or fertile metallic carbide nuclear fuel compositions into a form from which any unburned fuel, fission products and transmutation products may be readily and economically partitioned, as by solvent extraction or distillation processes. Other objects will be readily obvious, or readily inferred, from the ensuing description.

The technology by which solid nuclear reactor spent fuels are processed to partition the unburned fuel, transmutation and fission products by separation processes such as solvent extraction and distillation is fairly well established. The neutron irradiated fuel discharged from a nuclear reactor becomes the initial feed material for these separation processes, especially for solvent extraction processes. However, before it is amenable for such processing it must be first converted into a form amenable to and accessible to ready dissolution into aqueous nitrate solvent extraction feed solution from which the desired metal values may be efficiently separated. This process of conversion had, until recently, never been regarded as a serious problem in the case of carbide fuels since it was well known that such carbides are rather easily hydrolyzed by dilute acidic or basic aqueous solutions at rather mild temperatures. For example, it is known that unirradiated uranium carbide undergoes rapid hydrolysis by reaction with dilute aqueous solution of nitric acid at a temperature of about 80° C. However, recent investigations have disclosed that the chemical reactivity of irradiated carbide is considerably decreased to the point where most stringent conditions (provided by increasing the concentration of acid) are necessary to effect complete hydrolysis. These conditions cause adverse oxidation and polymerization side reactions which yield deleterious by-products which interfere with the efficiency of subsequent solvent extraction processing. What is needed, and what the present invention provides, is a rapid and efficient method for converting a carbide nuclear fissile or fertile fuel into a substantially carbon-free product which is readily dissolved to form a solvent extraction feed solution. The present invention meets this requirement and the previously mentioned objects by a process comprising contacting a carbide reactor fuel of the class described with superheated steam in an oxygen-free atmosphere, at a temperature in the range 700–1150° C.

For use as a reactor fuel, a fissile or fertile metallic carbide-containing fuel element may take one of several forms. For example, uranium monocarbide may be fabricated by powder metallurgical techniques into sintered compacts, or by arc casting, into various desired geometric forms which are enclosed or bonded to a corrosion-resistant metallic capsule made, for example, of zirconium, niobium or alloys thereof, or a corrosion-resistant stainless steel. Typically, the reactor fuel element takes the form of an elongated stainless steel or zirconium alloy tube containing a charge of compacted uranium carbide billets or rods with the carbide being thermally bonded to the tube and the tube being sealed or capped at both ends to provide complete containment of the fuel. When such a fuel element is removed from a reactor it undergoes a processing schedule designed to recover the unburned fuel and separate it, if deemed necessary, from fission products and transmutation products. In order to render the spent fuel available for chemical reaction, the fuel elements are mechanically chopped into small sizes and the chopped fuel is then ready for further processing. For the most part, aqueous processing techniques are used to separate and recover the unburned fuel and the desired fission and transmutation by-products. In accordance with this invention, the spent carbide fuel is contacted with superheated steam at a minimal temperature of 700° C. and up to a maximum temperature not exceeding about 1150° C. In its preferred form, the invention is simply carried out by sweeping the steam through a mass of the irradiated carbide. Under these conditions, the carbide mass is quantitatively converted, within a period generally less than about three hours, to an unusually free-flowing powdered form of crystalline uranium dioxide. The resultant oxide product is quite different from the product achieved when the same carbide is treated with air or oxygen within the same range of temperature. In the oxidation case, a sintered, clinkered oxide product results which bridges across the reactor and adheres to the metal cladding material, thus making it difficult to separate or dissolve by normal means.

As previously noted, the lower limit of temperature of hydrolysis is 700° C. This lower temperature limitation is not critical in the sense that no reaction occurs at lower temperatures, but is rather based on the finding that complete conversion to a free-flowing and substantially carbon-free product is achievable only when a reatcion temperature of at least 700° C. is reached. The pyrohydrolysis may be represented as (1) $UC+2H_2O \rightarrow UO_2+C+2H_2$, (2) $C+H_2O \rightarrow CO+H_2$ and (3) $C+2H_2O \rightarrow CO_2+2H_2$. The production of a carbon free product is extremely advantageous and, in fact, necessary when the susbequent contemplated separation procedure involves liquid-liquid solvent extraction techniques, because the presence of more than trace amounts of carbon has been found to seriously interfere with the efficiency of solvent extraction separations. Our findings have been to the effect that while the carbide is convertible to an oxide form at temperatures lower than 700° C., carbon clean-up is not effective until a temperature in the range 700–1150° C. is reached.

The upper temperature limitation of the process may be as low as 800° C. to as much as 1150° C., said temperature depending on the composition of the carbide fuel to be treated. In this connection, two classes of carbide fuels should be delineated. Assuming the fuel to be UC or any other fissile or fertile carbide, the first class has already been described. Such a fuel composition takes the form of a series of compacts or arc-cast pellets or slugs encased in a metallic jacket. For the purpose of processing in accordance with the present invention, the metallic jacket is mechanically sheared or cut to expose the carbide fuel to the steam. In carbide fuel compositions of this type, quantitative conversion of carbon to the gas phase and pyrohydrolysis of the carbide to a carbon-free and free-flowing powder is achieved at a rapid and controllable rate at a temperature in the range 700–800° C. with no practical advantage in using higher temperatures. A second class of carbide fuel finds the fissile and/or fertile carbide dispersed in a graphite matrix or where each carbide particle is coated by a layer of graphite. In the second class of carbide fuel compositions, conversion of the coating or matrix material can only be achieved efficiently if such a fuel composition is exposed to steam at a temperature of at least 1000° C. and up to about 1150° C. to convert the carbon coating or graphite matrix to gaseous products and thereby expose the carbide available for reaction with steam. The steam pyrohydrolyzed carbide will be converted to the desirable powder so long as the pyrohydrolysis temperature does not exceed 1150° C. Higher temperatures lead to sintering of the pyrohydrolyzed oxide product.

While a detailed understanding of the pyrohydrolysis reaction is lacking, a possible explanation is that the carbon reaction product has an extremely high surface area for reaction. It is also plausible that the finely divided oxide powder produced at the lower temperature acts as a catalytic surface for the ready conversion of the carbon particles. Hence, the carbon is readily vaporized as a gaseous product at the unexpectedly low temperatures in the form of carbon monoxide and/or carbon dioxide.

The resultant uranium dioxide product may be utilized in several different ways. In the first place, since it is a free-flowing powder, it may be readily separated from the reaction chamber. A likely route for the powder is to dissolve it into an aqueous solution of nitric acid and the resultant solution adjusted to provide a solvent extraction feed solution so that partition of fissionable, fertile and fission product values are effected.

Having described the invention in general terms, the following example will illustrate a specific embodiment thereof in which the controlling and limiting parameters are defined in somewhat greater detail in connection with a neutron-irradiated fuel element containing uranium monocarbide in a fuel element irradiated up to 16000 megawatt days per ton.

*Example*

In this example, the pyrolhydrolysis of uranium monocarbide was conducted in a reactor consisting of a vertically mounted quartz tube connected at the top end to a source of steam. The bottom of the tube was joined to a steam condenser which, in turn, was connected to a gas collection bottle. A porous quartz frit mounted near the midlength line of the reactor tube served as a supporting stage for the carbide charge. In practice, an irradiated carbide fuel charge was placed on the quartz frit and the quartz tube heated to a desired temperature by a clam shell furnace surrounding the tube section of the apparatus. Before heating to the desired temperature, an inert gas flow was swept through the reactor in order to remove oxygen. Steam was then introduced to be swept over and through the carbide sample at a temperature of at least 700° C. for a period of time ranging from two to in excess of six hours. A series of runs was conducted in this manner, and after each run the solid product, the steam condensate and the dry gas samples passing from the condensate to the gas collection bottle were all analyzed for uranium and fission product content. It was found that in all runs conducted at a temperature of less than 700° C. incomplete conversion of the uranium carbide had been effected, as evidenced by the fact that continuous evolution of all gases were noted, even after six hours of operation with the solid reaction product having a considerable carbon assay. The off-gas reaction products resulting from the pyrohydrolysis of the uranium carbide in all cases consisted principally of 80–85% hydrogen and the remainder carbon monoxide and carbon dioxide.

The effect of temperature upon the reaction rate and time of completion of the reaction is shown in the curves of the graph of the accompanying figure. As clearly shown, the reaction at 650° C. is still incomplete after six hours, as evidenced by the fact that continuous evolution of off-gas (hydrogen, carbon monoxide and carbon dioxide) was still noted at the end of the six-hour period. On the other hand, the reaction is substantially complete in about two to three hours at 700° C., and in about one hour at 750° C. The solid reaction product resulting from the completion of the 700° C. and 750° C. runs consisted of a virtually carbon-free, free-flowing uranium dioxide powder, as identified by X-ray diffraction techniques. This powder was easily transferable to another container whence, it is readily dissolved in an aqueous solution of nitric acid.

The steam condensate from each of these runs contained no detectable uranium. Of the total fission product activity in the original sample, less than 0.5% of the cesium, less than 0.05% of the ruthenium and less than 0.006% of the zirconium was found in the steam condensate and the dry gas collected in the gas collection bottle was free of any radioactivity.

The uranium dioxide product from the steam pyrohydrolysis run at 750° C. was dissolved in 6.5 molar nitric acid at 105° C. to produce a solvent extraction feed solution, 1.36 M in $UO_2(NO_3)_2$ and 3 M in nitric acid. This solution also contained about 0.03 wt. percent of a finely divided carbon which was not volatilized by the pyrohydrolysis reaction. This nitrate solution and a control (i.e. totally carbon-free) solution of the same uranyl nitrate and nitric acid molarity were each subjected to solvent extraction using a n-tributyl phosphate as the uranium extracting agent. The uranyl nitrate was extracted from each solution using 6 aliquots of 30% n-tributyl phosphate dissolved in an organic solvent and then subsequently stripped from the solvent with several aliquots of 0.01 molar nitric acid. Uranium recovery was in excess of 99.99% in both cases, indicating that the presence of the trace amounts of carbon impurity did not intererefe with efficiency of solvent extraction.

It should be noted that the process of this invention, in its preferred embodiment, consists in carrying out the pyrohydrolysis of the fissile and fertile metal carbides in an essentially oxygen-free atmosphere. This limitation is placed on the process out of an abundance of caution, and in regard for safety considerations, since the possibility exists for the formation of an ignitable hydrogen-oxygen mixture at the elevated pyrohydrolysis temperature conditions used in this invention. In any event, the presence of oxygen would serve no useful purpose since the product would then be simply a powdered form of a higher oxide of uranium, thorium or plutonium, as the case may be. For example, in the case of uranium, the result of pyrohydrolysis in the presence of oxygen would result in the formation of a higher oxide up to $U_3O_8$. But, if a higher oxide of uranium is the desired reaction product, it may simply be obtained by oxidation of the uranium product resulting from the oxygen-free pyrohydrolysis reaction rather than through a route by which an ignitable hydrogen-oxygen mixture may be formed.

It will be seen that there has been described an efficient and quantitative method for the rapid conversion of fissile and fertile metal carbide nuclear fuels into a purified free-flowing oxide product. While the invention has been described with reference to uranium mono-carbide, it is equally applicable to other reactor fuel materials, such as uranium dicarbide, a thorium carbide, a plutonium carbide or mixtures thereof. A distinct advantage of this invention lies in the physical form of the resultant solid product. Since it is in the form of a freely flowing non-adherent powder, it can be readily transferred to other reactor vessels for further treatment or purification such as by conversion to a solvent extraction species or conversion to a volatile fluoride or chloride species for partition by distillation techniques. This would also apply to a thorium oxide or plutonium oxide product. The retention of the major amounts of volatile fission products, cesium and ruthenium is a distinct advantage in that the radioactivity is concentrated in the solid phase rather than dispersed into the steam condensate or reaction off-gas stream. Thus, the problem of dealing with fission-product laden off-gasses is simplified since the said fission products are retained in a form from which they can be readily partitioned by solvent extraction techniques. Furthermore, the pyrohydrolysis reaction of this invention is featured by its control and reproducibility regardless of the fabrication or radiation history of the initial carbide charge. In all cases, a virtually carbon-free, free-flowing powder is produced within about three hours at a temperature in the range 700–1150° C., and, as previously noted, the trace amounts of carbon which do remain do not interfere with subsequent solvent extraction processes applied to the oxide product.

As used herein the term "carbon-free" as applied to the oxide product produced by this invention refers to a carbon concentration which does not interfere with the efficiency of solvent extraction of a feed solution containing the dissolved oxide. The term "essentially oxygen-free atmosphere" should be taken to mean a steam atmosphere which, if contains oxygen, is present at such a concentration as to preclude formation of an ignitable hydrogen-oxygen mixture under the process conditions herein disclosed. The term "pyrohydrolysis" or "hydrolysis" as used here refers to the conversion of a metal carbide of the selected class to a powdered metal oxide.

Having thus described our invention, we claim:

1. A method for hydrolyzing a metal carbide of a metal selected from uranium, thorium and plutonium which comprises contacting said carbide with an essentially oxygen-free steam atmosphere at a temperature in the range 700–1150° C. until the selected metal carbide is converted to a carbon-free oxide powder.

2. In a process for hydrolyzing a nuclear fuel selected from a fissionable or fertile carbide fabricated into a fuel element in which the selected metal carbide is encased in a protective metal cladding and wherein said cladding is at least partially removed to expose said fuel, the steps which comprise contacting said exposed carbide to an essentially oxygen-free steam atmosphere at a temperature in the range 700–800° C. until the selected carbide is converted into a carbon-free oxide powder.

3. In a process for hydrolyzing the metal carbide portion of a nuclear fuel composition comprising a carbon-coated particle of a fissionable or fertile metal carbide, the steps which comprise contacting said composition with an essentially oxygen-free steam atmosphere at a temperature in the range 1000–1150° C. until the selected carbide is converted to a carbon-free ovide powder.

4. In a process for hydrolyzing the metal carbide portion of a nuclear fuel composition comprising a carbon or graphite matrix a fissionable or fertile metal carbide dispersed in said matrix, the steps which comprise contacting said composition with an essentially oxygen-free steam atmosphere at a temperature in the range 1000–1150° C. until the selected carbide is converted to a carbon-free oxide powder.

References Cited by the Examiner

FOREIGN PATENTS 1,314,141 11/1962 France.
997,355 7/1965 Great Britain.

OTHER REFERENCES

Overholser et al.: AECD–ORNL 3262, Reactor Chemistry Division Annual Progress Report for Period Ending Jan. 31, 1962, p. 143.

Ehret: Smith's College Chemistry, 6th Edition, D. Appelton-Century Co., Incorporated, 1946, p. 386.

Reactor Fuel Processing, vol. 5, No. 4, page 49, October 1962, prepared for AEC by Argonne Nat. Lab.

DEWAYNE RUTLEDGE, *Primary Examiner.*

BENJAMIN R. PADGETT, *Examiner.*

S. TRAUB, *Assistant Examiner.*